Nov. 17, 1942.  C. L. FREDERICK  2,302,609
ALTERNATING-CURRENT DIRECT-CURRENT MOTOR CIRCUITS
Filed May 18, 1940
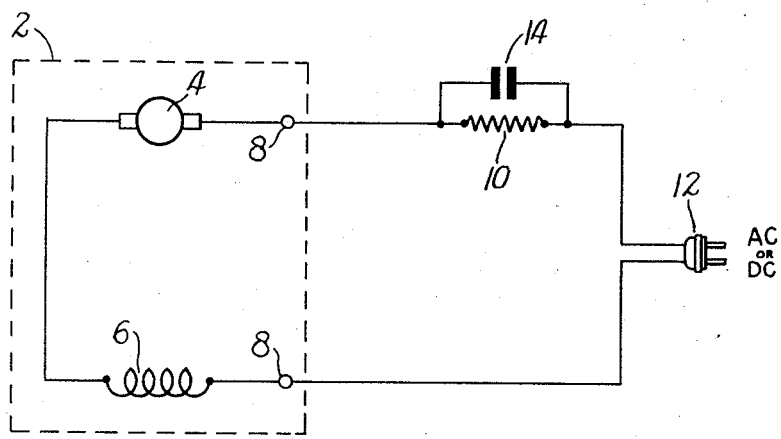
INVENTOR
Carl L. Frederick
BY
Blair, Curtis & Hayward
ATTORNEYS Patented Nov. 17, 1942

2,302,609

UNITED STATES PATENT OFFICE 2,302,609

ALTERNATING-CURRENT-DIRECT-CURRENT MOTOR CIRCUITS

Carl L. Frederick, Fairfield, Conn., assignor to Dictaphone Corporation, New York, N. Y., a corporation of New York Application May 18, 1940, Serial No. 335,901

3 Claims. (Cl. 172—276)

This invention relates to control circuits for the operation of universal A. C.—D. C. motors, and the like.

Frequently it is desirable to have electrical apparatus which is operable either on A. C. or D. C. power supplies. If the circuit or load elements of this electrical apparatus are entirely resistive, as, for example, electric heater elements, such operation presents no particular problem, even if a substantially constant, predetermined value of current is necessary to operate these elements satisfactorily. However, if one of these load elements is partially reactive, as, for example, an electric motor, difficulty is encountered in universal operation. When such apparatus is connected to an A. C. supply the reactive characteristic of the load elements causes added impedance to the flow of current therethrough and thus decreases the current flow as compared to the flow when the apparatus is connected to a D. C. supply of equal voltage. If, for satisfactory operation of a load element such as a constant speed motor, a substantially constant, predetermined value of current is required on both A. C. and D. C., then it is necessary to make some provision for increasing the current flow when the instrument is connected to an A. C. power supply.

In the past numerous arrangements have been suggested for accomplishing this effect, but all of these arrangements have necessitated the use of relays or switches or other moving parts for altering the connections to various circuit elements; such, for example, as those arrangements shown in the U. S. Letters Patent 1,244,510 and 1,244,511 to Benjamin G. Lamme. But, as above-mentioned, all of these previous arrangements have had the disadvantage of using movable parts or "make-and-break" contacts which require continuous servicing and are easily damaged or broken.

It is an object of this invention to provide a simple and efficient electric circuit arrangement in which an electrical load element requiring a substantially constant, predetermined value of current for proper operation may be operated satisfactorily from either an A. C. or a D. C. power supply in an automatic and entirely electrical manner without the need for switches, relays, or other moving elements.

This and other apparent objects and advantages are obtained by the means described in the following specification, and may be more readily understood by reference to the accompanying drawing which shows a schematic wiring diagram of the preferred embodiment of the invention applied to the circuit of a universal motor.

Referring to the drawing, this invention is illustrated in connection with an electric circuit load element 2 which is here shown as a universal A. C.—D. C. constant speed motor such as might be used in the well-known forms of commercial dictating machines. Such a universal motor is usually of the series type having a commutated armature 4 and a field winding 6 connected in series. In many instruments where such motors are used, as, for example, in dictating machines, it is necessary that the motor run at a constant speed, whether it be connected to an A. C. power supply or to a D. C. power supply of equal voltage. This necessitates a substantially constant magnetic field condition in the motor, which in turn requires a constant, predetermined value of current to flow through the armature winding 4 and the field winding 6. However, both the armature 4 and the field 6 are iron-cored coils having a certain amount of inductance which develops an inductive reactance when the motor is connected to an A. C. supply, thereby producing added impedance to the flow of current therethrough. Thus, if the terminals 8 of the motor 2 are connected directly to an A. C. power supply, the current flowing through armature 4 and field 6 will be much less than if the terminals 8 are connected to a D. C. power supply of equal voltage. In the past, one method of overcoming this change in impedance was to connect a variable resistance in series with the motor 2 and the power supply, and to use a switching or sliding contact arrangement which permitted removing most of this resistance from the circuit when the motor was connected to an A. C. supply. Thus, the voltage across the terminals 8 of the motor 2 was higher under the A. C. condition than under the D. C. condition, so that the same current flowed through the motor elements under both situations, both supply voltages being equal, even though the total impedance of the motor was substantially increased when it was operating on A. C. power. Also, it has been suggested heretofore that such an alteration of the resistance in the circuit could be accomplished by the use of a relay. Such arrangements though operable, either required a manual adjustment whenever the motor was to be shifted from A. C. to D. C., or vice versa, or else were subject to the disadvantage of using moving parts with their inherent tendency to get out of adjustment.

In accordance with the embodiment of the present invention herein described, a resistor 10 is connected in series with the motor armature 4 and field 6, across a standard type of plug connector 12 to facilitate the connection of the motor 2 to any available power supply. A condenser 14 is connected across resistor 10.

By such an arrangement, with a proper choice of values for resistance 10 and condenser 14, the circuit is automatically conditioned for operation on either an A. C. or D. C. power supply, so that a substantially constant value of current flows through the windings of motor 2 on both types of power supply, whereby it operates at substantially constant speed at all times, both supply voltages being equal. This effect results because the condenser 14 has substantially no effect for D. C. operation so that the resistance 10, in series with motor armature 4 and field winding 6, is the current controlling element and its value is such that the current flow therethrough is limited to the desired amount. However, when plug 12 is inserted in an A. C. power supply socket, condenser 14 acts as a conductor connecting a relatively low impedance across resistor 10 and thus effectively decreases the overall impedance thereacross. This decrease in the effective impedance in series with the motor windings increases the voltage available across terminals 8 of the motor and thus compensates for the increase in impedance of the motor windings due to inductive reactance, so that substantially the same value of current flows through the motor windings as under D. C. operation. As an example of values which have been found to give satisfactory operation with a fractional horse power series type universal dictating machine motor, accurate operation has resulted when resistance 10 has a value of 400 ohms and condenser 14 a capacity of 6.5 microfarads.

As many embodiments might be made of the above invention, and as many changes might be made in the embodiment above described, it is to be understood that all structures hereinbefore described and shown in the accompanying drawing are to be considered as illustrative only and not in a limiting sense.

I claim:

1. In an electric motor drive system adapted to operate from an A. C. or D. C. power supply and in which a load is to be driven at an approximately constant speed by a universal series-type motor capable of operating from an A. C. or D. C. power supply and having a greater overall impedance when operated on A. C. than when operated on D. C., the combination with said motor of a compensating assembly adapted to be connected between said motor and a power supply comprising a current-limiting resistor connected in series with said motor and said power supply to limit the current to said motor to its proper operating value when said system is connected to a D. C. power supply, and a condenser connected in parallel with said resistor, said condenser being effective when said system is connected to an A. C. power supply to reduce the impedance across said resistor and thus the impedance between said motor and said power supply to compensate for the increased impedance of said motor due to the application of A. C. thereto, whereby the proper operating current is supplied to said motor whether said system is connected to an A. C. or D. C. power supply.

2. In an electric motor drive system adapted to operate from an A. C. or D. C. power supply and in which a load is to be driven at an approximately constant speed by a universal motor capable of operating from an A. C. or D. C. power supply and having a greater overall impedance when operated on A. C. than when operated on D. C., the combination with said motor of a compensating assembly adapted to be connected between said motor and a power supply comprising current-limiting resistance means connected in series with said motor and said power supply to limit the current through said motor to its proper operating value when said system is connected to a D. C. power supply, and capacitive impedance means connected in parallel with said resistance means, said impedance means being effective when said system is connected to an A. C. power supply to reduce the potential drop across said resistance means and thus the drop between said motor and said power supply to compensate for the increased impedance of said motor due to the application of A. C. thereto, whereby the proper operating current is supplied to said motor whether said system is connected to an A. C. or D. C. power supply.

3. In an electrically energized system adapted to be operated from an A. C. or D. C. power supply and in which electric apparatus is to be supplied with electric power at an approximately constant current, said electric apparatus being capable of operating on A. C. or D. C. but having a greater over-all impedance when operated on A. C. than when operated on D. C., the combination with said electric apparatus of a compensating assembly adapted to be connected between said apparatus and a power supply comprising a current limiting resistor connected in series with said electric apparatus and said power supply to limit the current to said apparatus to its proper operating value when said system is connected to a D. C. power supply, and a condenser connected in parallel with said resistor, said condenser being effective when said system is connected to an A. C. power supply to reduce the impedance across said resistor and thus the impedance between said electric apparatus and said power supply to compensate for the increased impedance of said electric apparatus due to the application of A. C. thereto, whereby the proper operating current is supplied to said electric apparatus whether said system is connected to an A. C. or D. C. power supply.

CARL L. FREDERICK.